US012206335B2

(12) United States Patent
Ichida et al.

(10) Patent No.: US 12,206,335 B2
(45) Date of Patent: Jan. 21, 2025

(54) POWER CONVERSION APPARATUS

(71) Applicant: TOYOTA JIDOSHA KABUSHIKI KAISHA, Toyota (JP)

(72) Inventors: Satoshi Ichida, Susono (JP); Kazuhiro Sugimoto, Ashigarakami-gun (JP); Manabu Handa, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 230 days.

(21) Appl. No.: 18/160,370

(22) Filed: Jan. 27, 2023

(65) Prior Publication Data

US 2023/0327562 A1   Oct. 12, 2023

(30) Foreign Application Priority Data

Apr. 7, 2022   (JP) .................... 2022-063786

(51) Int. Cl.
*H02M 3/335*   (2006.01)
*H02M 1/42*   (2007.01)

(52) U.S. Cl.
CPC ..... *H02M 3/33523* (2013.01); *H02M 1/4208* (2013.01); *H02M 3/33573* (2021.05)

(58) Field of Classification Search
CPC ........... H02M 1/4208; H02M 3/33523; H02M 3/33573

USPC ........................................ 363/21.01
See application file for complete search history.

(56) References Cited

U.S. PATENT DOCUMENTS

| 2016/0016479 | A1* | 1/2016 | Khaligh | H02M 1/4258 |
| | | | | 336/170 |
| 2022/0045618 | A1* | 2/2022 | Kumar | H02J 50/12 |
| 2022/0045619 | A1* | 2/2022 | Jia | H02M 3/015 |

FOREIGN PATENT DOCUMENTS

| CN | 107284273 A | 10/2017 |
| CN | 109624733 A | 4/2019 |
| JP | 2021-164338 A | 10/2021 |
| JP | 2021-175262 A | 11/2021 |

\* cited by examiner

*Primary Examiner* — Yemane Mehari
(74) *Attorney, Agent, or Firm* — Oliff PLC

(57) ABSTRACT

A power conversion apparatus includes a transformer including a first winding, a second winding, and a third winding, a first switching circuit connected between an external power supply and the first winding, a second switching circuit connected between a main battery and the second winding, and a third switching circuit connected between an auxiliary battery and the third winding. The first switching circuit includes a power factor correction circuit, a smoothing capacitor configured to smooth a voltage of direct-current power output from the power factor correction circuit, and a relay provided in a power line between the smoothing capacitor and the first winding.

3 Claims, 3 Drawing Sheets

POWER CONVERSION APPARATUS

CROSS-REFERENCE TO RELATED APPLICATION

This application claims priority to Japanese Patent Application No. 2022-063786 filed on Apr. 7, 2022, incorporated herein by reference in its entirety.

BACKGROUND

1. Technical Field

The disclosure relates to a power conversion apparatus.

2. Description of Related Art

Japanese Unexamined Patent Application Publication No. 2021-164338 (JP 2021-164338 A) describes that, in a power conversion apparatus mounted on an externally chargeable electrified vehicle, electric power is transferred via a transformer among an external power supply, a main battery, and an auxiliary battery. In the configuration described in JP 2021-164338 A, the transformer has three windings, electric power is transferred via the transformer when the main battery is charged with electric power from the external power supply, and electric power is transferred via the transformer when the auxiliary battery is supplied with electric power from the main battery.

SUMMARY

In the configuration described in JP 2021-164338 A, if a short circuit occurs in a PFC-side circuit while electric power is being transferred from the main battery to the auxiliary battery, a current flows from the PFC-side circuit to a main battery-side circuit and an auxiliary battery-side circuit via the transformer. For this reason, an overcurrent may occur in the main battery-side circuit and the auxiliary battery-side circuit.

The disclosure provides a power conversion apparatus capable of avoiding an overcurrent via a transformer.

An aspect of the disclosure provides a power conversion apparatus. The power conversion apparatus includes a transformer including a first winding, a second winding, and a third winding, a first switching circuit connected between an external power supply and the first winding, the first switching circuit being configured to supply the first winding with electric power input from the external power supply, a second switching circuit connected between a main battery and the second winding, the second switching circuit being configured to supply the main battery with electric power input from the first switching circuit via the transformer, the second switching circuit being configured to supply the second winding with electric power output from the main battery, and a third switching circuit connected between an auxiliary battery and the third winding, the third switching circuit being configured to supply the auxiliary battery with electric power input from the second switching circuit via the transformer. The first switching circuit includes a power factor correction circuit configured to improve a power factor of alternating-current power input from the external power supply, a smoothing capacitor configured to smooth a voltage of direct-current power output from the power factor correction circuit, and a relay provided in a power line between the smoothing capacitor and the first winding.

With this configuration, it is possible to selectively interrupt a current path between the first winding and the smoothing capacitor by switching the relay between an open state and a closed state. Therefore, when the relay is in an open state, the current path between the smoothing capacitor and the first winding is interrupted, so, if a short circuit occurs in the smoothing capacitor, flow of an overcurrent to the second switching circuit and the third switching circuit via the transformer is prevented.

The first switching circuit may include a first bridge circuit configured to convert direct-current power, output from the power factor correction circuit, to alternating-current power and supply the alternating-current power to the first winding, and the relay may be provided in a power line between the first bridge circuit and the first winding.

With this configuration, it is possible to selectively interrupt a current path between the first winding and the first bridge circuit by switching the relay between an open state and a closed state. Therefore, when the relay is in an open state, the current path between the switching element of the first bridge circuit and the first winding is interrupted, so, if a short circuit occurs in any one of the switching elements, flow of an overcurrent to the second switching circuit and the third switching circuit via the transformer is prevented.

The main battery and the auxiliary battery may be mounted on an electrified vehicle, and, when the electrified vehicle is traveling, the relay is open, and electric power from the main battery may be transferred to the auxiliary battery via the transformer.

With this configuration, when electric power from the main battery is transferred to the auxiliary battery while the electrified vehicle is traveling, flow of an overcurrent to the second switching circuit and the third switching circuit via the transformer is prevented by opening the relay if a short circuit occurs in the first switching circuit.

According to the aspect of the disclosure, it is possible to selectively interrupt a current path between the first winding and the smoothing capacitor by switching the relay between an open state and a closed state. Therefore, when the relay is in an open state, the current path between the smoothing capacitor and the first winding is interrupted, so, if a short circuit occurs in the smoothing capacitor, flow of an overcurrent to the second switching circuit and the third switching circuit via the transformer is prevented.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, a power conversion apparatus according to an embodiment of the disclosure will be specifically described with reference to the accompanying drawings. The disclosure is not limited to the embodiment described below.

Figure 1:
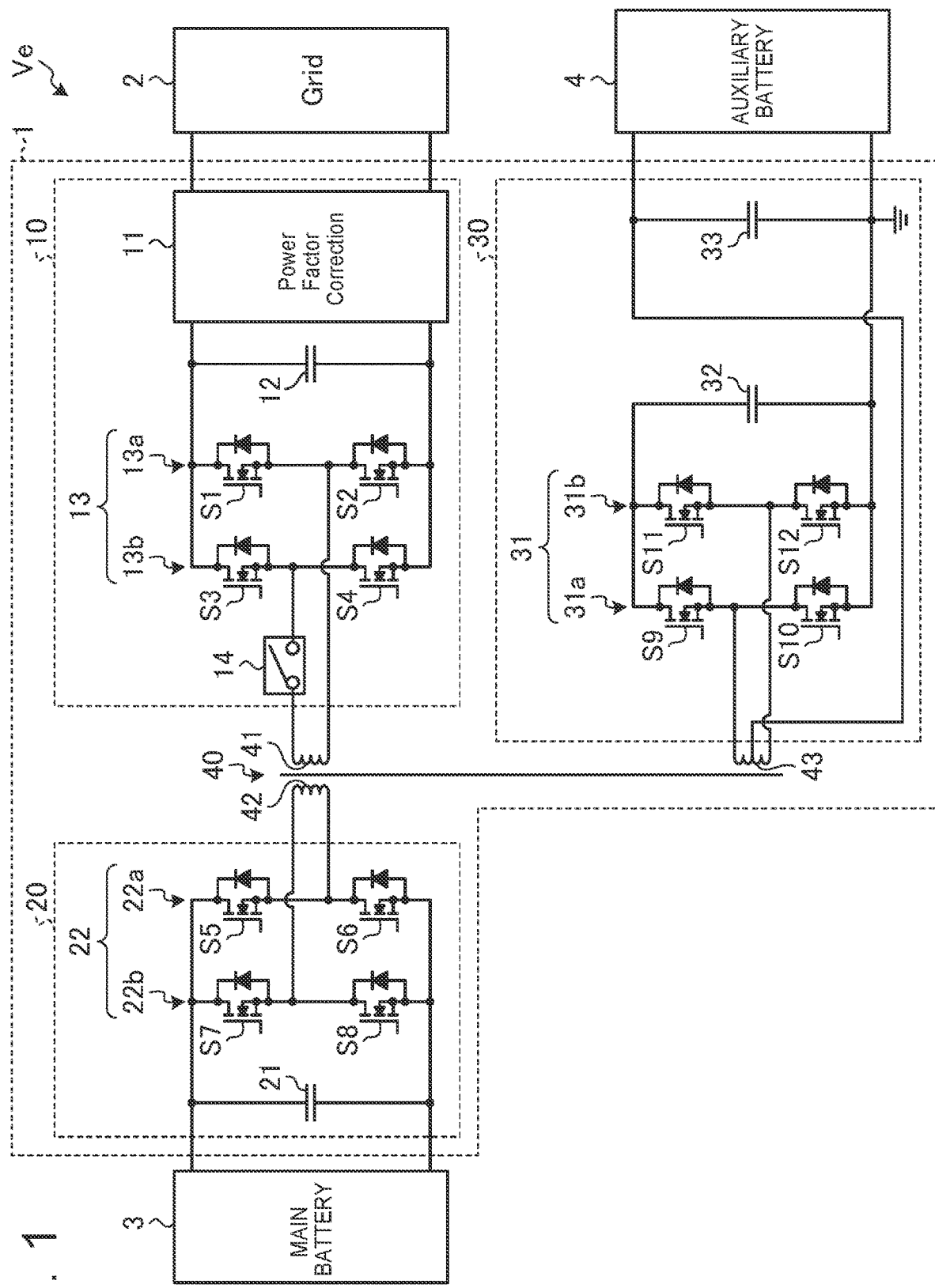
FIG. 1 is a circuit diagram that shows a power conversion apparatus according to an embodiment.

FIG. 1 is a circuit diagram that shows the power conversion apparatus according to the embodiment. The power conversion apparatus 1 is mounted on a vehicle Ve that is externally chargeable. The vehicle Ve is an electrified vehicle including a battery allowed to be charged with electric power supplied from an external source and a drive motor configured to be driven by using electric power from the battery. Examples of the vehicle Ve include a plug-in hybrid electric vehicle (PHEV) and a battery electric vehicle (BEV). The power conversion apparatus 1 is used to supply electric power from an alternating-current power supply, such as a commercial power supply and a domestic power supply, to a battery mounted on the vehicle Ve and to supply alternating-current power from the battery mounted on the vehicle Ve to an electrical apparatus outside the vehicle Ve. In other words, the power conversion apparatus 1 functions as a charger and an AC feeder.

The power conversion apparatus 1 supplies electric power among an external power supply 2, a main battery 3, and an auxiliary battery 4. The external power supply 2 is an alternating-current power supply, such as a commercial power supply (system power supply) and a domestic power supply. The main battery 3 and the auxiliary battery 4 are direct-current power supplies mounted on the vehicle Ve. The main battery 3 is a secondary battery that stores electric power to be supplied to the drive motor. The main battery 3 supplies motoring electric power to the motor and is charged with electric power generated by regenerative braking with the motor. The auxiliary battery 4 is a secondary battery that is charged with electric power to be supplied to auxiliaries such as an audio device, a room light, and an air conditioner mounted on the vehicle Ve. The power conversion apparatus 1 supplies electric power, supplied from the external power supply 2, to the main battery 3 and the auxiliary battery 4. The power conversion apparatus 1 supplies electric power from the main battery 3 to the auxiliary battery 4. In other words, the power conversion apparatus 1 functions as an auxiliary DC-DC converter in addition to the charger and the AC feeder.

The power conversion apparatus 1 includes a first switching circuit 10, a second switching circuit 20, a third switching circuit 30, and a transformer 40. The main battery 3 is connected to the second switching circuit 20. The auxiliary battery 4 is connected to the third switching circuit 30. When external charging is performed, the external power supply 2 is connected to the first switching circuit 10 as shown in FIG. 1. The power conversion apparatus 1 transfers electric power via the transformer 40 among the external power supply 2, the main battery 3, and the auxiliary battery 4.

The transformer 40 includes a first winding 41, a second winding 42, and a third winding 43. The first winding 41, the second winding 42, and the third winding 43 are magnetically coupled to one another. Both ends of the first winding 41 are connected to the first switching circuit 10. Both ends of the second winding 42 are connected to the second switching circuit 20. Both ends of the third winding 43 are connected to the third switching circuit 30.

The first switching circuit 10 is connected between the external power supply 2 and the first winding 41. The first switching circuit 10 supplies the first winding 41 with electric power supplied from the external power supply 2. The first switching circuit 10 includes a power factor correction (PFC) circuit 11, a smoothing capacitor 12, a first bridge circuit 13, and a relay 14.

The PFC circuit 11 improves the power factor of alternating-current power input from the external power supply 2, converts the alternating-current power to direct-current power, and outputs the direct-current power to the first bridge circuit 13. During external charging, the external power supply 2 is connected to alternating-current terminals of the PFC circuit 11. The first bridge circuit 13 is connected to a positive electrode terminal and a negative electrode terminal of the PFC circuit 11.

The smoothing capacitor 12 smooths the voltage of direct-current power output from the PFC circuit 11. The smoothing capacitor 12 is connected to power lines between the PFC circuit 11 and the first bridge circuit 13. The smoothing capacitor 12 is a first capacitor.

The first bridge circuit 13 is a full-bridge circuit connected to the positive electrode terminal and negative electrode terminal of the PFC circuit 11. The first bridge circuit 13 includes a switching arm 13a and a switching arm 13b. The switching arm 13a includes switching elements S1, S2 connected in series. The switching arm 13b includes switching elements S3, S4 connected in series. The switching arms 13a, 13b are connected in parallel. The smoothing capacitor 12 is connected in parallel with the switching arms 13a, 13b. An upper-side parallel connection point among the switching arms 13a, 13b and the smoothing capacitor 12 is connected to the positive electrode terminal of the PFC circuit 11. A lower-side parallel connection point among the switching arms 13a, 13b and the smoothing capacitor 12 is connected to the negative electrode terminal of the PFC circuit 11. The first winding 41 is connected between a connection point between the switching element S1 and the switching element S2 and a connection point between the switching element S3 and the switching element S4.

The relay 14 is provided in a power line between the first bridge circuit 13 and the first winding 41. The relay 14 is provided in a power line between one end of the first winding 41 and the connection point between the switching element S3 and the switching element S4. When the relay 14 is in a closed state (ON state), the first winding 41 and the first switching circuit 10 are connected such that a current can pass between the first winding 41 and the first switching circuit 10. On the other hand, when the relay 14 is in an open state (OFF state), the first winding 41 and the first switching circuit 10 are interrupted from each other such that no current can pass.

The second switching circuit 20 is connected between the main battery 3 and the second winding 42. The second switching circuit 20 supplies the second winding 42 with electric power from the main battery 3. The second switching circuit 20 includes a main capacitor 21 and a second bridge circuit 22.

The main capacitor 21 is connected between a positive electrode line and a negative electrode line of the main battery 3. The main capacitor 21 is a second capacitor.

The second bridge circuit 22 is a full-bridge circuit connected to the positive electrode terminal and negative electrode terminal of the main battery 3. The second bridge circuit 22 includes a switching arm 22a and a switching arm 22b. The switching arm 22a includes switching elements S5, S6 connected in series. The switching arm 22b includes switching elements S7, S8 connected in series. The switching arms 22a, 22b are connected in parallel. The main capacitor 21 is connected in parallel with the switching arms 22a, 22b. An upper-side connection point among the switching arms 22a, 22b and the main capacitor 21 is connected to the positive electrode terminal of the main battery 3. A lower-side connection point among the switching arms 22a, 22b and the main capacitor 21 is connected to the negative electrode terminal of the main battery 3. The second winding 42 is connected between a connection point between the switching element S5 and the switching element S6 and a connection point between the switching element S7 and the switching element S8.

The third switching circuit 30 is connected between the auxiliary battery 4 and the third winding 43. The third switching circuit 30 supplies the third winding 43 with electric power from the auxiliary battery 4. The third switching circuit 30 includes a third bridge circuit 31, an intermediate capacitor 32, and an auxiliary capacitor 33.

The third bridge circuit 31 includes a switching arm 31a and a switching arm 31b. The switching arm 31a includes switching elements S9, S10 connected in series. The switching arm 31b includes switching elements S11, S12 connected in series. The switching arms 31a, 31b are connected in parallel. The intermediate capacitor 32 is connected in parallel with the switching arms 31a, 31b. The third winding 43 is connected between a connection point between the switching element S9 and the switching element S10 and a connection point between the switching element S11 and the switching element S12.

The auxiliary capacitor 33 is connected between a lower-side parallel connection point among the switching arms 31a, 31b and the intermediate capacitor 32 and a midway point of the third winding 43. The midway point of the third winding 43 is connected to the positive electrode terminal of the auxiliary battery 4. The lower-side parallel connection point among the switching arms 31a, 31b and the intermediate capacitor 32 is connected to the negative electrode terminal of the auxiliary battery 4. The midway point of the third winding 43 is a midway point of a conductor wire forming the third winding 43. The midway point may be a center tap provided at the middle point of a conductor wire forming the third winding 43. The auxiliary capacitor 33 is a third capacitor. The intermediate capacitor 32 is a fourth capacitor.

Diodes are respectively connected to the switching elements S1, S2, S3, S4, S5, S6, S7, S8, S9, S10, S11, S12 such that anode terminals are respectively connected to the lower end sides of the switching elements S1, S2, S3, S4, S5, S6, S7, S8, S9, S10, S11, S12. Each of the switching elements S1, S2, S3, S4, S5, S6, S7, S8, S9, S10, S11, S12 is made up of an insulated gate bipolar transistor (IGBT) or a metal oxide semiconductor field effect transistor (MOSFET).

Here, the operation of the power conversion apparatus 1 will be described.

The operation of the power conversion apparatus 1 is different between a case where electric power is supplied between the external power supply 2 and the main battery 3 in a state where the vehicle Ve is stopped (charger or AC feeder) and a case where electric power is supplied between the main battery 3 and the auxiliary battery 4 in a state where the vehicle Ve is traveling (auxiliary DC-DC converter).

Initially, the operation of the power conversion apparatus 1 in the case where electric power is supplied between the external power supply 2 and the main battery 3 in a state where the vehicle Ve is stopped will be described. When the power conversion apparatus 1 functions as a charger or an AC feeder, the external power supply 2 is connected to the PFC circuit 11. For example, an external power supply 2-side charging plug is connected to a charging port provided on the vehicle Ve. An input terminal of the power conversion apparatus 1, that is, the alternating-current terminal of the PFC circuit 11, is provided at the charging port.

When the main battery 3 is charged by using the external power supply 2 in a state where the vehicle Ve is stopped, the power conversion apparatus 1 keeps the relay 14 in a closed state and transfers electric power from the external power supply 2 to the second switching circuit 20 via the first switching circuit 10 and the transformer 40.

In this case, the PFC circuit 11 controls the current flowing through the alternating-current terminal of the PFC circuit 11 through the switching operation such that the temporal waveform of current flowing through the alternating-current terminal is approximated to or brought into coincidence with the temporal waveform of alternating-current voltage output from the external power supply 2. While the PFC circuit 11 performs the operation to improve the power factor, the PFC circuit 11 converts alternating-current power input from the external power supply 2 to direct-current power and outputs the direct-current power to the first bridge circuit 13. The PFC circuit 11 steps up the voltage of electric power supplied from the external power supply 2 and outputs the electric power to the first bridge circuit 13. In other words, a terminal voltage of the smoothing capacitor 12 is adjusted by the PFC circuit 11. At this time, the power conversion apparatus 1 adjusts the output voltage of the PFC circuit 11 such that the output voltage is higher than a voltage peak value of the external power supply 2. For example, the charging voltage of the main battery 3 is 350 V, and the charging voltage of the auxiliary battery 4 is 14.5 V. The output voltage of the PFC circuit 11 is adjusted to 400 V.

The first bridge circuit 13 outputs alternating-current voltage to the first winding 41 by performing switching over the direct-current voltage output from the PFC circuit 11. In other words, the first bridge circuit 13 converts the direct-current power of the PFC circuit 11 to alternating-current power and supplies the alternating-current power to the first winding 41. When electric power is transferred to the second switching circuit 20 via the transformer 40, electric power is transferred to the second switching circuit 20 in accordance with a difference between the switching timing of the first bridge circuit 13 and the switching timing of the second bridge circuit 22.

The second switching circuit 20 supplies the main battery 3 with electric power transferred from the first switching circuit 10. In this case, the second bridge circuit 22 converts the alternating-current power transferred from the second winding 42 to direct-current power and supplies the direct-current power to the main battery 3. At this time, the second switching circuit 20 is capable of outputting electric power to the main battery 3 and outputting electric power to a load circuit connected to the main battery 3.

When the main battery 3 is charged with electric power from the external power supply 2, the auxiliary battery 4 can be charged with electric power from the external power supply 2. The power conversion apparatus 1 transfers electric power from the external power supply 2 to the third switching circuit 30 via the first switching circuit 10 and the transformer 40.

When electric power is transferred to the third switching circuit 30 via the transformer 40, electric power is transferred to the third switching circuit 30 in accordance with a difference between the switching timing of the first bridge circuit 13 and the switching timing of the third bridge circuit 31.

The third switching circuit 30 supplies the auxiliary battery 4 with electric power transferred from the first switching circuit 10. In this case, the third switching circuit 30 initially charges the intermediate capacitor 32 with electric power supplied from the first switching circuit 10 via the transformer 40. Through the switching operation of the third bridge circuit 31, electric power is output from the intermediate capacitor 32 to the auxiliary battery 4 via the midway point of the third winding 43.

A terminal voltage of the intermediate capacitor 32 is adjusted by controlling a phase difference that is a delay of the phase of switching of the switching arms 31a, 31b of the third bridge circuit 31 with respect to the phase of switching of the switching arms 13a, 13b of the first bridge circuit 13. The third bridge circuit 31 outputs alternating-current voltage to the third winding 43 by performing switching of voltage to the intermediate capacitor 32. In the power conversion apparatus 1, the switching arms 13a, 13b, 22a, 22b, 31a, 31b perform switching operation with the same duty ratio D. Therefore, through the switching operation of the third bridge circuit 31, a voltage (1−D) times the terminal voltage of the intermediate capacitor 32 appears at both ends of each of the auxiliary battery 4 and the auxiliary capacitor 33. In this way, the third bridge circuit 31 supplies electric power transferred from the first switching circuit 10 to the auxiliary battery 4 via the intermediate capacitor 32. At this time, the third switching circuit 30 is capable of outputting electric power to the auxiliary battery 4 and outputting electric power to auxiliaries connected to the auxiliary battery 4.

With this configuration, in the first switching circuit 10 and the third switching circuit 30, the terminal voltage of the smoothing capacitor 12 is stepped down to the terminal voltage of the intermediate capacitor 32, and the terminal voltage of the intermediate capacitor 32 is stepped down to the terminal voltage of the auxiliary battery 4 and the terminal voltage of the auxiliary capacitor 33. Electric power stepped down in a stepwise manner in this way is supplied.

Next, the operation of the power conversion apparatus 1 in the case where electric power is supplied between the main battery 3 and the auxiliary battery 4 while the vehicle Ve is traveling will be described. When the power conversion apparatus 1 functions as an auxiliary DC-DC converter, the external power supply 2 is isolated from the PFC circuit 11, and the PFC circuit 11 stops switching operation. When the main battery 3 supplies electric power to the auxiliary battery 4 while the vehicle Ve is traveling, the power conversion apparatus 1 keeps the relay 14 in an open state and transfers electric power from the main battery 3 to the third switching circuit 30 via the second switching circuit 20 and the transformer 40.

In this case, the second bridge circuit 22 outputs alternating-current voltage to the second winding 42 by performing switching over direct-current voltage output from the main battery 3. The second bridge circuit 22 converts direct-current power from the main battery 3 to alternating-current power and supplies the alternating-current power to the second winding 42. When electric power is transferred to the third switching circuit 30 via the transformer 40, electric power is transferred to the third switching circuit 30 in accordance with a difference between the switching timing of the second bridge circuit 22 and the switching timing of the third bridge circuit 31.

The third switching circuit 30 supplies the auxiliary battery 4 with electric power transferred from the second switching circuit 20. In this case, the third switching circuit 30, as in the case during external charging, initially charges the intermediate capacitor 32 with electric power supplied from the second switching circuit 20 via the transformer 40. Through the switching operation of the third bridge circuit 31, electric power is output from the intermediate capacitor 32 to the auxiliary battery 4 via the midway point of the third winding 43.

In this way, when the vehicle Ve is traveling, electric power is supplied from the main battery 3 to the auxiliary battery 4 in a state where the relay 14 is in an open state, and the auxiliary battery 4 is charged. If a short circuit occurs in the smoothing capacitor 12 of the first switching circuit 10, a current path between the first winding 41 and the smoothing capacitor 12 is interrupted because the relay 14 is in an open state. Flow of a current to the first winding 41 due to a short circuit of the smoothing capacitor 12 is prevented by setting the relay 14 in an open state while the vehicle Ve is traveling. Therefore, while the vehicle Ve is traveling, an overcurrent in the main battery 3-side second switching circuit 20 and the auxiliary battery 4-side third switching circuit 30 is avoided by transfer of electric power from the first switching circuit 10 via the transformer 40.

If a circuit does not include the relay 14, the second switching circuit 20 and the first switching circuit 10 are driven such that the terminal voltage of the PFC-side smoothing capacitor 12 is kept at 400 V. Therefore, if a short circuit occurs in the smoothing capacitor 12, a current flowing through the main battery 3-side circuit and a current flowing through the auxiliary battery 4-side circuit increase. In the case of, for example, 1000 W output, the value of current flowing through the main battery 3-side circuit increases from 4 Aac to 50 Aac, and the value of current flowing through the auxiliary battery 4-side circuit increases from 50 Aac to 180 Aac. A battery fuse can melt due to the increase in current. In contrast, in the power conversion apparatus 1 including the relay 14, flow of an overcurrent to the second switching circuit 20 and the third switching circuit 30 via the transformer 40 is prevented.

As described above, according to the embodiment, when electric power is supplied from the main battery 3 to the auxiliary battery 4, transfer of electric power from the first switching circuit 10 to the second switching circuit 20 and the third switching circuit 30 via the transformer 40 is prevented because the relay 14 is in an open state. Thus, when a short circuit occurs in the smoothing capacitor 12 of the first switching circuit 10, flow of an overcurrent to the second switching circuit 20 and the third switching circuit 30 is prevented because the relay 14 is in an open state.

Figure 2:
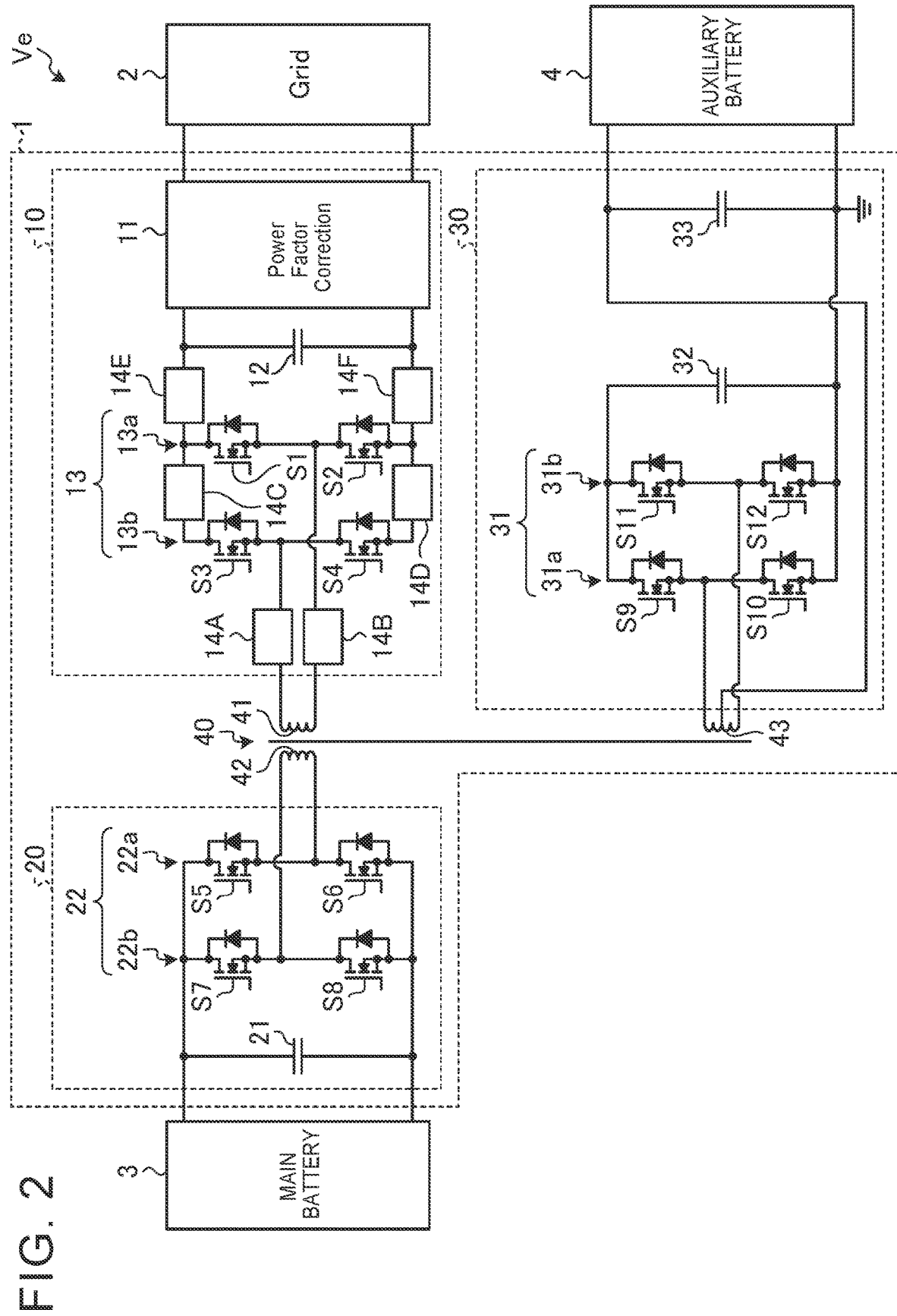
FIG. 2 is a circuit diagram for illustrating an installation location of a relay between a smoothing capacitor and a winding in a PFC-side circuit.

An installation location of the relay 14 is not limited to the above-described embodiment. As measures against a short circuit of the smoothing capacitor 12, the relay 14 just needs to be provided in a power line between the smoothing capacitor 12 and the first winding 41. As shown in FIG. 2, first to sixth installation locations 14A, 14B, 14C, 14D, 14E, 14F may be used as an installation location of the relay 14 in this case.

The first installation location 14A is a power line between the first winding 41 and a connection point between the switching elements S1, S2. The second installation location 14B is a power line between the first winding 41 and a connection point between the switching elements S3, S4. The third installation location 14C is a power line connecting the upper side of the switching arm 13a with the upper side of the switching arm 13b. The fourth installation location 14D is a power line connecting the lower side of the switching arm 13a with the lower side of the switching arm 13b. The fifth installation location 14E is a power line connecting the upper side of the switching arm 13a with the upper side of the smoothing capacitor 12. The sixth installation location 14F is a power line connecting the upper side of the switching arm 13b with the upper side of the smoothing capacitor 12.

As measures against a short circuit of the smoothing capacitor 12, the relay 14 just needs to be provided in at least any one of the first to sixth installation locations 14A, 14B, 14C, 14D, 14E, 14F. In other words, the number of the relays 14 is not limited to one and may be installed at multiple installation locations.

Figure 3:
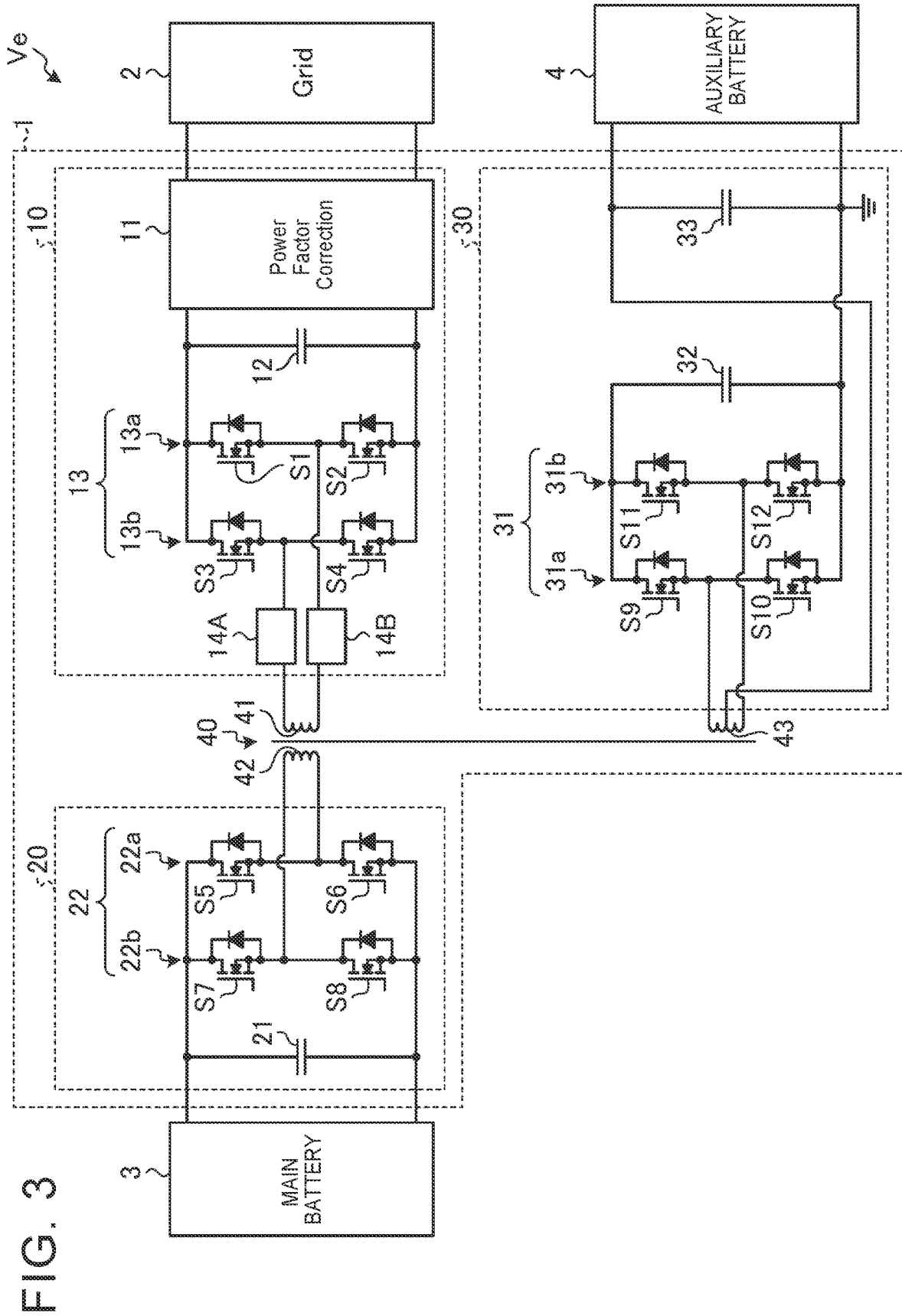
FIG. 3 is a circuit diagram for illustrating an installation location of a relay between a switching element and a winding in a PFC-side circuit.

A short circuit of the first switching circuit 10 is not limited to the smoothing capacitor 12, and it is conceivable that a short circuit occurs even in the switching elements of the first bridge circuit 13. As measures against a short circuit in the switching elements S1, S2, S3, S4 of the first bridge circuit 13, the relay 14 just needs to be provided in a power line between the first bridge circuit 13 and the first winding 41. As shown in FIG. 3, the first and second installation locations 14A, 14B may be used as an installation location of the relay 14 in this case.

As for measures against a short circuit of the switching elements of the first bridge circuit 13, the relay 14 just needs to be provided in at least any one of the first and second installation locations 14A, 14B. In this case as well, the number of the relays 14 is not limited to one, and the relays 14 may be respectively installed in the first and second installation locations 14A, 14B.

What is claimed is:

1. A power conversion apparatus comprising:
   a transformer including a first winding, a second winding, and a third winding; a first switching circuit connected between an external power supply and the first winding, the first switching circuit being configured to supply the first winding with electric power input from the external power supply;
   a second switching circuit connected between a main battery and the second winding, the second switching circuit being configured to supply the main battery with electric power input from the first switching circuit via the transformer, the second switching circuit being configured to supply the second winding with electric power output from the main battery; and
   a third switching circuit connected between an auxiliary battery and the third winding, the third switching circuit being configured to supply the auxiliary battery with electric power input from the second switching circuit via the transformer, wherein
   the first switching circuit includes a power factor correction circuit configured to improve a power factor of alternating-current power input from the external power supply, a smoothing capacitor configured to smooth a voltage of direct-current power output from the power factor correction circuit, and a relay provided in a power line between the smoothing capacitor and the first winding.

2. The power conversion apparatus according to claim 1, wherein:
   the first switching circuit includes a first bridge circuit configured to convert direct-current power, output from the power factor correction circuit, to alternating-current power and supply the alternating-current power to the first winding; and
   the relay is provided in a power line between the first bridge circuit and the first winding.

3. The power conversion apparatus according to claim 1, wherein:
   the main battery and the auxiliary battery are mounted on an electrified vehicle; and
   when the electrified vehicle is traveling, the relay is open, and electric power from the main battery is transferred to the auxiliary battery via the transformer.

* * * * *